(12) United States Patent
Ushiroda

(10) Patent No.: US 6,669,318 B2
(45) Date of Patent: Dec. 30, 2003

(54) IMAGE RECORDING APPARATUS, IMAGE RECORDING CONTROL METHOD, AND STORAGE MEDIUM

(75) Inventor: Atsushi Ushiroda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/897,074

(22) Filed: Jul. 3, 2001

(65) Prior Publication Data

US 2002/0021318 A1 Feb. 21, 2002

(30) Foreign Application Priority Data

Jul. 5, 2000 (JP) ........................... 2000/203882

(51) Int. Cl.$^7$ ................................ B41J 2/205
(52) U.S. Cl. ................. 347/15; 347/41; 347/9
(58) Field of Search ................. 347/15, 9, 10, 347/12, 19, 40, 41

(56) References Cited

U.S. PATENT DOCUMENTS

| 5,065,256 A | * | 11/1991 | Suganuma et al. | 347/9 |
|---|---|---|---|---|
| 5,696,542 A | | 12/1997 | Matsubara et al. | 347/12 |
| 5,818,474 A | | 10/1998 | Takahashi et al. | 347/15 |
| 6,042,212 A | | 3/2000 | Takahashi et al. | 347/15 |
| 6,102,510 A | * | 8/2000 | Kikuta et al. | 358/455 |
| 6,118,457 A | | 9/2000 | Ohtsuka et al. | 345/434 |
| 2002/0024558 A1 | * | 2/2002 | Fujita et al. | 347/43 |

FOREIGN PATENT DOCUMENTS

| JP | 60-107975 | 6/1985 |
|---|---|---|
| JP | 6-143618 | 5/1994 |

* cited by examiner

Primary Examiner—Stephen D. Meier
Assistant Examiner—Lam Nguyen
(74) Attorney, Agent, or Firm—Fitzpatrick, Cella, Harper & Scinto

(57) ABSTRACT

As a thinning pattern which is used in a multipass recording method, plural mask patterns are created according to a printing mode from a pseudo periodic mask arrangement that an arrangement of non-recording pixels and recording pixels becomes visually preferable when binarization is performed at an arbitrary level. Thus, as compared with a mask pattern based on a random number, generation of a repetitive pattern and deterioration of graininess can be lowered, and the number of memories for storing the mask patterns can be reduced.

27 Claims, 14 Drawing Sheets

FIG. 8

|   | | | | | | | | | | | | | | | | |
|---|---|---|---|---|---|---|---|---|---|---|---|---|---|---|---|---|
| a | 167 | 3 | 226 | 103 | 110 | 43 | 22 | 142 | 152 | 53 | 248 | 136 | 160 | 17 | 135 | 102 |
| b | 244 | 38 | 132 | 57 | 186 | 139 | 225 | 25 | 80 | 149 | 49 | 255 | 8 | 200 | 1 | 140 |
| c | 65 | 205 | 107 | 137 | 128 | 34 | 123 | 234 | 100 | 147 | 21 | 64 | 222 | 145 | 62 | 77 |
| d | 215 | 105 | 31 | 182 | 230 | 60 | 254 | 119 | 201 | 150 | 181 | 131 | 36 | 83 | 199 | 171 |
| e | 7 | 228 | 115 | 164 | 44 | 233 | 112 | 151 | 33 | 39 | 82 | 94 | 216 | 163 | 63 | 239 |
| f | 176 | 54 | 196 | 18 | 209 | 89 | 249 | 59 | 188 | 189 | 227 | 245 | 56 | 242 | 14 | 29 |
| g | 159 | 126 | 144 | 58 | 173 | 241 | 69 | 211 | 9 | 217 | 16 | 35 | 190 | 101 | 253 | 246 |
| h | 92 | 247 | 76 | 229 | 90 | 177 | 87 | 197 | 109 | 180 | 117 | 212 | 71 | 114 | 11 | 218 |
| i | 116 | 79 | 220 | 72 | 66 | 111 | 166 | 28 | 55 | 143 | 104 | 146 | 85 | 130 | 204 | 13 |
| j | 237 | 30 | 252 | 157 | 75 | 172 | 0 | 206 | 179 | 48 | 240 | 232 | 108 | 154 | 88 | 236 |
| k | 165 | 42 | 97 | 95 | 193 | 185 | 67 | 40 | 91 | 224 | 37 | 32 | 223 | 194 | 93 | 73 |
| ℓ | 74 | 191 | 6 | 148 | 68 | 118 | 203 | 214 | 106 | 231 | 169 | 4 | 208 | 24 | 113 | 210 |
| m | 41 | 122 | 158 | 23 | 198 | 238 | 47 | 195 | 27 | 61 | 2 | 155 | 81 | 213 | 156 | 153 |
| n | 183 | 192 | 134 | 26 | 141 | 45 | 251 | 84 | 202 | 184 | 170 | 10 | 46 | 138 | 124 | 50 |
| o | 19 | 86 | 121 | 219 | 15 | 174 | 70 | 221 | 51 | 99 | 235 | 161 | 187 | 250 | 127 | 129 |
| p | 96 | 168 | 98 | 243 | 207 | 52 | 133 | 12 | 125 | 175 | 20 | 78 | 120 | 162 | 5 | 178 |

FIG. 10

| | | | | | | | | | | | | | | | | |
|---|---|---|---|---|---|---|---|---|---|---|---|---|---|---|---|---|
| a | 0 | 1 | 0 | 0 | 0 | 1 | 1 | 0 | 0 | 1 | 0 | 0 | 0 | 1 | 0 | 0 |
| b | 0 | 1 | 0 | 1 | 0 | 0 | 0 | 1 | 0 | 0 | 1 | 0 | 1 | 0 | 1 | 0 |
| c | 0 | 0 | 0 | 0 | 0 | 1 | 0 | 0 | 0 | 0 | 1 | 0 | 0 | 0 | 1 | 0 |
| d | 0 | 0 | 1 | 0 | 0 | 1 | 0 | 0 | 0 | 0 | 0 | 0 | 1 | 0 | 0 | 0 |
| e | 1 | 0 | 0 | 0 | 1 | 0 | 0 | 0 | 1 | 1 | 0 | 0 | 0 | 0 | 1 | 0 |
| f | 0 | 1 | 0 | 1 | 0 | 0 | 0 | 1 | 0 | 0 | 0 | 0 | 1 | 0 | 1 | 1 |
| g | 0 | 0 | 0 | 1 | 0 | 0 | 0 | 0 | 1 | 0 | 1 | 1 | 0 | 0 | 0 | 0 |
| h | 0 | 0 | 0 | 0 | 0 | 0 | 0 | 0 | 0 | 0 | 0 | 0 | 0 | 0 | 1 | 0 |
| i | 0 | 0 | 0 | 0 | 0 | 0 | 0 | 1 | 1 | 0 | 0 | 0 | 0 | 0 | 0 | 1 |
| j | 0 | 1 | 0 | 0 | 0 | 0 | 1 | 0 | 0 | 1 | 0 | 0 | 0 | 0 | 0 | 0 |
| k | 0 | 1 | 0 | 0 | 0 | 0 | 0 | 1 | 0 | 0 | 1 | 1 | 0 | 0 | 0 | 0 |
| ℓ | 0 | 0 | 1 | 0 | 0 | 0 | 0 | 0 | 0 | 0 | 0 | 1 | 0 | 1 | 0 | 0 |
| m | 1 | 0 | 0 | 1 | 0 | 0 | 1 | 0 | 1 | 1 | 1 | 0 | 0 | 0 | 0 | 0 |
| n | 0 | 0 | 0 | 1 | 0 | 1 | 0 | 0 | 0 | 0 | 0 | 1 | 1 | 0 | 0 | 1 |
| o | 1 | 0 | 0 | 0 | 1 | 0 | 0 | 0 | 1 | 0 | 0 | 0 | 0 | 0 | 0 | 0 |
| p | 0 | 0 | 0 | 0 | 0 | 1 | 0 | 1 | 0 | 0 | 1 | 0 | 0 | 0 | 1 | 0 |

FIG. 11

| | | | | | | | | | | | | | | | | |
|---|---|---|---|---|---|---|---|---|---|---|---|---|---|---|---|---|
| e | 0 | 0 | 1 | 0 | 0 | 0 | 1 | 0 | 0 | 0 | 1 | 1 | 0 | 0 | 0 | 0 |
| f | 0 | 0 | 0 | 0 | 0 | 1 | 0 | 0 | 0 | 0 | 0 | 0 | 0 | 0 | 0 | 0 |
| g | 0 | 1 | 0 | 0 | 0 | 0 | 1 | 0 | 0 | 0 | 0 | 0 | 0 | 1 | 0 | 0 |
| h | 1 | 0 | 1 | 0 | 1 | 0 | 1 | 0 | 1 | 0 | 1 | 0 | 1 | 1 | 0 | 0 |
| i | 1 | 1 | 0 | 1 | 1 | 1 | 0 | 0 | 0 | 0 | 1 | 0 | 1 | 0 | 0 | 0 |
| j | 0 | 0 | 0 | 0 | 1 | 0 | 0 | 0 | 0 | 0 | 0 | 0 | 1 | 0 | 1 | 0 |
| k | 0 | 0 | 1 | 1 | 0 | 0 | 1 | 0 | 1 | 0 | 0 | 0 | 0 | 0 | 1 | 1 |
| ℓ | 1 | 0 | 0 | 0 | 1 | 1 | 0 | 0 | 1 | 0 | 0 | 0 | 0 | 0 | 1 | 0 |
| m | 0 | 1 | 0 | 0 | 0 | 0 | 0 | 0 | 0 | 0 | 0 | 0 | 1 | 0 | 0 | 0 |
| n | 0 | 0 | 0 | 0 | 0 | 0 | 0 | 1 | 0 | 0 | 0 | 0 | 0 | 0 | 1 | 0 |
| o | 0 | 1 | 1 | 0 | 0 | 0 | 1 | 0 | 0 | 1 | 0 | 0 | 0 | 0 | 1 | 0 |
| p | 1 | 0 | 1 | 0 | 0 | 0 | 0 | 0 | 1 | 0 | 0 | 1 | 1 | 0 | 0 | 0 |
| a | 0 | 0 | 0 | 1 | 1 | 0 | 0 | 0 | 0 | 0 | 0 | 0 | 0 | 0 | 0 | 1 |
| b | 0 | 0 | 0 | 0 | 0 | 0 | 0 | 0 | 1 | 0 | 0 | 0 | 0 | 0 | 0 | 0 |
| c | 1 | 0 | 1 | 0 | 0 | 0 | 1 | 0 | 1 | 0 | 0 | 1 | 0 | 0 | 0 | 1 |
| d | 0 | 1 | 0 | 0 | 0 | 0 | 0 | 1 | 0 | 0 | 0 | 0 | 0 | 1 | 0 | 0 |

FIG. 12

|   | | | | | | | | | | | | | | | | |
|---|---|---|---|---|---|---|---|---|---|---|---|---|---|---|---|---|
| i | 0 | 0 | 0 | 0 | 0 | 0 | 1 | 0 | 0 | 1 | 0 | 1 | 0 | 1 | 0 | 0 |
| j | 0 | 0 | 0 | 1 | 0 | 1 | 0 | 0 | 1 | 0 | 0 | 0 | 0 | 1 | 0 | 0 |
| k | 1 | 0 | 0 | 0 | 0 | 1 | 0 | 0 | 0 | 0 | 0 | 0 | 0 | 0 | 0 | 0 |
| ℓ | 0 | 1 | 0 | 1 | 0 | 0 | 0 | 0 | 0 | 0 | 1 | 0 | 0 | 0 | 0 | 0 |
| m | 0 | 0 | 1 | 0 | 0 | 0 | 0 | 0 | 0 | 0 | 0 | 1 | 0 | 0 | 1 | 1 |
| n | 1 | 0 | 1 | 0 | 1 | 0 | 0 | 0 | 0 | 1 | 1 | 0 | 0 | 1 | 0 | 0 |
| o | 0 | 0 | 0 | 0 | 0 | 1 | 0 | 0 | 0 | 0 | 0 | 1 | 1 | 0 | 0 | 1 |
| p | 0 | 1 | 0 | 0 | 0 | 0 | 1 | 0 | 0 | 1 | 0 | 0 | 0 | 1 | 0 | 1 |
| a | 1 | 0 | 0 | 0 | 0 | 0 | 0 | 1 | 1 | 0 | 0 | 1 | 1 | 0 | 1 | 0 |
| b | 0 | 0 | 1 | 0 | 1 | 1 | 0 | 0 | 0 | 1 | 0 | 0 | 0 | 0 | 0 | 1 |
| c | 0 | 0 | 0 | 1 | 1 | 0 | 0 | 0 | 0 | 1 | 0 | 0 | 0 | 1 | 0 | 0 |
| d | 0 | 0 | 0 | 1 | 0 | 0 | 0 | 0 | 0 | 1 | 1 | 1 | 0 | 0 | 0 | 1 |
| e | 0 | 0 | 0 | 1 | 0 | 0 | 0 | 1 | 0 | 0 | 0 | 0 | 0 | 1 | 0 | 0 |
| f | 1 | 0 | 0 | 0 | 0 | 0 | 0 | 0 | 1 | 1 | 0 | 0 | 0 | 0 | 0 | 0 |
| g | 1 | 0 | 1 | 0 | 1 | 0 | 0 | 0 | 0 | 0 | 0 | 0 | 1 | 0 | 0 | 0 |
| h | 0 | 0 | 0 | 0 | 0 | 1 | 0 | 0 | 0 | 1 | 0 | 0 | 0 | 0 | 0 | 0 |

FIG. 13

| | | | | | | | | | | | | | | | | |
|---|---|---|---|---|---|---|---|---|---|---|---|---|---|---|---|---|
| m | 0 | 0 | 0 | 0 | 1 | 1 | 0 | 1 | 0 | 0 | 0 | 0 | 0 | 1 | 0 | 0 |
| n | 0 | 1 | 0 | 0 | 0 | 0 | 1 | 0 | 1 | 0 | 0 | 0 | 0 | 0 | 0 | 0 |
| o | 0 | 0 | 0 | 1 | 0 | 0 | 0 | 1 | 0 | 0 | 1 | 0 | 0 | 1 | 0 | 0 |
| p | 0 | 0 | 0 | 1 | 1 | 0 | 0 | 0 | 0 | 0 | 0 | 0 | 0 | 0 | 0 | 0 |
| a | 0 | 0 | 1 | 0 | 0 | 0 | 0 | 0 | 0 | 0 | 1 | 0 | 0 | 0 | 0 | 0 |
| b | 1 | 0 | 0 | 0 | 0 | 0 | 1 | 0 | 0 | 0 | 0 | 1 | 0 | 1 | 0 | 0 |
| c | 0 | 1 | 0 | 0 | 0 | 0 | 0 | 1 | 0 | 0 | 0 | 0 | 1 | 0 | 0 | 0 |
| d | 1 | 0 | 0 | 0 | 1 | 0 | 1 | 0 | 1 | 0 | 0 | 0 | 0 | 0 | 1 | 0 |
| e | 0 | 1 | 0 | 0 | 0 | 1 | 0 | 0 | 0 | 0 | 0 | 0 | 1 | 0 | 0 | 1 |
| f | 0 | 0 | 1 | 0 | 1 | 0 | 1 | 0 | 0 | 0 | 1 | 1 | 0 | 1 | 0 | 0 |
| g | 0 | 0 | 0 | 0 | 0 | 1 | 0 | 1 | 0 | 1 | 0 | 0 | 0 | 0 | 1 | 1 |
| h | 0 | 1 | 0 | 1 | 0 | 0 | 0 | 1 | 0 | 0 | 0 | 1 | 0 | 0 | 0 | 1 |
| i | 0 | 0 | 1 | 0 | 0 | 0 | 0 | 0 | 0 | 0 | 0 | 0 | 0 | 0 | 1 | 0 |
| j | 1 | 0 | 1 | 0 | 0 | 0 | 0 | 1 | 0 | 0 | 1 | 1 | 0 | 0 | 0 | 1 |
| k | 0 | 0 | 0 | 0 | 1 | 0 | 0 | 0 | 0 | 1 | 0 | 0 | 1 | 1 | 0 | 0 |
| ℓ | 0 | 0 | 0 | 0 | 0 | 0 | 1 | 1 | 0 | 1 | 0 | 0 | 1 | 0 | 0 | 1 |

IMAGE RECORDING APPARATUS, IMAGE RECORDING CONTROL METHOD, AND STORAGE MEDIUM

BACKGROUND OF THE INVENTION

1. Field of the Invention

The present invention relates to an image recording apparatus, an image recording control method, and a storage medium. Particularly, the present invention relates to an image recording apparatus which is suitable in a case where an image is formed on a recording medium by a recording head having plural recording elements, an image recording control method which controls the image recording apparatus, and a storage medium which stores a program to execute the image recording control method.

2. Related Background Art

Conventionally, as an apparatus which forms an image on a recording medium such as a sheet, an OHP (overhead projector) sheet or the like, the apparatus in a form that a recording head of one of various recording systems is installed has been proposed. As the recording systems, there are a wire dot recording system, a thermal (thermosensitive) recording system, a thermal transfer recording system, an inkjet recording system and the like. In any of these recording systems, the recording head in which plural recording elements are united is generally used to increase recording efficiency.

In such a mechanism as above, striped density unevenness which originates in dispersion of recording elements and mechanical accuracy when the record head and the recording medium are shifted and moved could not be avoided. Concretely, in the inkjet recording system, a detailed stripe might be caused due to slight differences of ink discharge directions and ink discharge quantities among ink discharge nozzles acting as the recording elements, and also the striped density unevenness might be caused at recording medium shift interval due to an error of nozzle interval and an error of recording medium shift quantity.

As a method to correct such the density unevenness, for example, a multipass recording method as disclosed in Japanese Patent Application (Laid-Open) No. 60-107975 is used. Further, in order to prevent mischief due to interference between a thinning pattern and an image pattern in the multipass recording method, a recording apparatus which performs thinning by using a random mask pattern disclosed in, e.g. U.S. Pat. Nos. 5,818,474, 6,042,212 and 6,118,457 has been known.

The method using the random mask pattern will be briefly explained. In an image recording apparatus which causes a recording head having plural recording elements to scan an identical recording area on a recording medium plural times, creates a thinned-out image according to a thinning pattern in each scan, and completes an entire image, the random mask pattern of a predetermined size in which non-recording pixels and recording pixels are arranged at random is used as the thinning pattern for each recording area. In this method, since the image is formed by printed pixels according to the random mask pattern, the thinned-out arrangement does not have any pattern period. Thus, the density unevenness which is caused based on the number of recording pixels in the plural-time multipass recording at the same recording area according to the conventional multipass recording method is eliminated by suppressing periodicity of the density unevenness.

However, there are several drawbacks in the above conventional case. Namely, when the period of a random number is short, a repetitive pattern appears in the output image. Besides, when a uniform random number is used as the random number, graininess deteriorates due to the low-frequency component of the random number. Further, a printer ordinarily has plural printing modes in accordance with a priority of printing quality/printing speed and a kind of printing medium. However, in the above conventional case, there is a drawback that, since it is necessary to prepare the thinning pattern for each printing mode, many memories are necessary.

SUMMARY OF THE INVENTION

The present invention is made in consideration of the above drawbacks, and an object thereof is to provide, in a case where recording is performed by a multipass recording method, an image recording apparatus which can lower generation of repetitive pattern and deterioration of graininess as compared with a mask pattern based on a random number, an image recording control method for the image recording apparatus, and a storage medium which stores a program to achieve the image recording control method.

Another object of the present invention is to provide, in the case where the recording is performed by the multipass recording method, an image recording apparatus which can reduce the number of memories for storing the mask patterns, an image recording control method for the image recording apparatus, and a storage medium which stores a program to achieve the image recording control method.

In order to achieve the above objects, the present invention is characterized by providing an image recording apparatus which divides a recording head having plural recording elements into plural areas, performs plural-time scans to an identical area on a recording medium such as a sheet by using the same or different areas of the divided recording head, and creates a thinned-out image according to a thinning pattern in each scan to complete an entire image, the apparatus comprising:

mask creation means for creating plural mask patterns from a pseudo periodic mask arrangement that an arrangement of non-recording pixels and recording pixels becomes visually preferable; and thinning means for thinning out recording data by using the mask patterns as the thinning patterns for respective recording areas by the recording head.

Further, in order to achieve the above objects, the present invention is characterized by providing an image recording control method which is applied to an image recording apparatus which divides a recording head having plural recording elements into plural areas, performs plural-time scans to an identical area on a recording medium such as a sheet by using the same or different areas of the divided recording head, and creates a thinned-out image according to a thinning pattern in each scan to complete an entire image, the method comprising:

a mask creation step of creating plural mask patterns from a pseudo periodic mask arrangement that an arrangement of non-recording pixels and recording pixels becomes visually preferable; and a thinning step of thinning out recording data by using the mask patterns as the thinning patterns for respective recording areas by the recording head.

Further, in order to achieve the above objects, the present invention is characterized by providing a computer-readable storage medium which stores a program to execute an image recording control method applicable to an image recording apparatus which divides a recording head having plural recording elements into plural areas, performs plural-time scans to an identical area on a recording medium such as a sheet by using the same or different areas of the divided recording head, and creates a thinned-out image according to a thinning pattern in each scan to complete an entire image, the method comprising:

a mask creation step of creating plural mask patterns from a pseudo periodic mask arrangement that an arrangement of non-recording pixels and recording pixels becomes visually preferable; and a thinning step of thinning out recording data by using the mask patterns as the thinning patterns for respective recording areas by the recording head.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the embodiments of the present invention and, together with the description, serve to explain the principles of the present invention.

FIG. 8 is a diagram showing an example of the mother mask pattern;

FIG. 10 is a diagram showing an example of the mask pattern;

FIG. 11 is a diagram showing an example of the mask pattern;

FIG. 12 is a diagram showing an example of the mask pattern;

FIG. 13 is a diagram showing an example of the mask pattern;

DETAILED DESCRIPTION OF THE PREFERRED EMBODIMENTS

The preferred embodiments of the present invention will now be described in detail in accordance with the accompanying drawings.

First Embodiment

Figure 1:
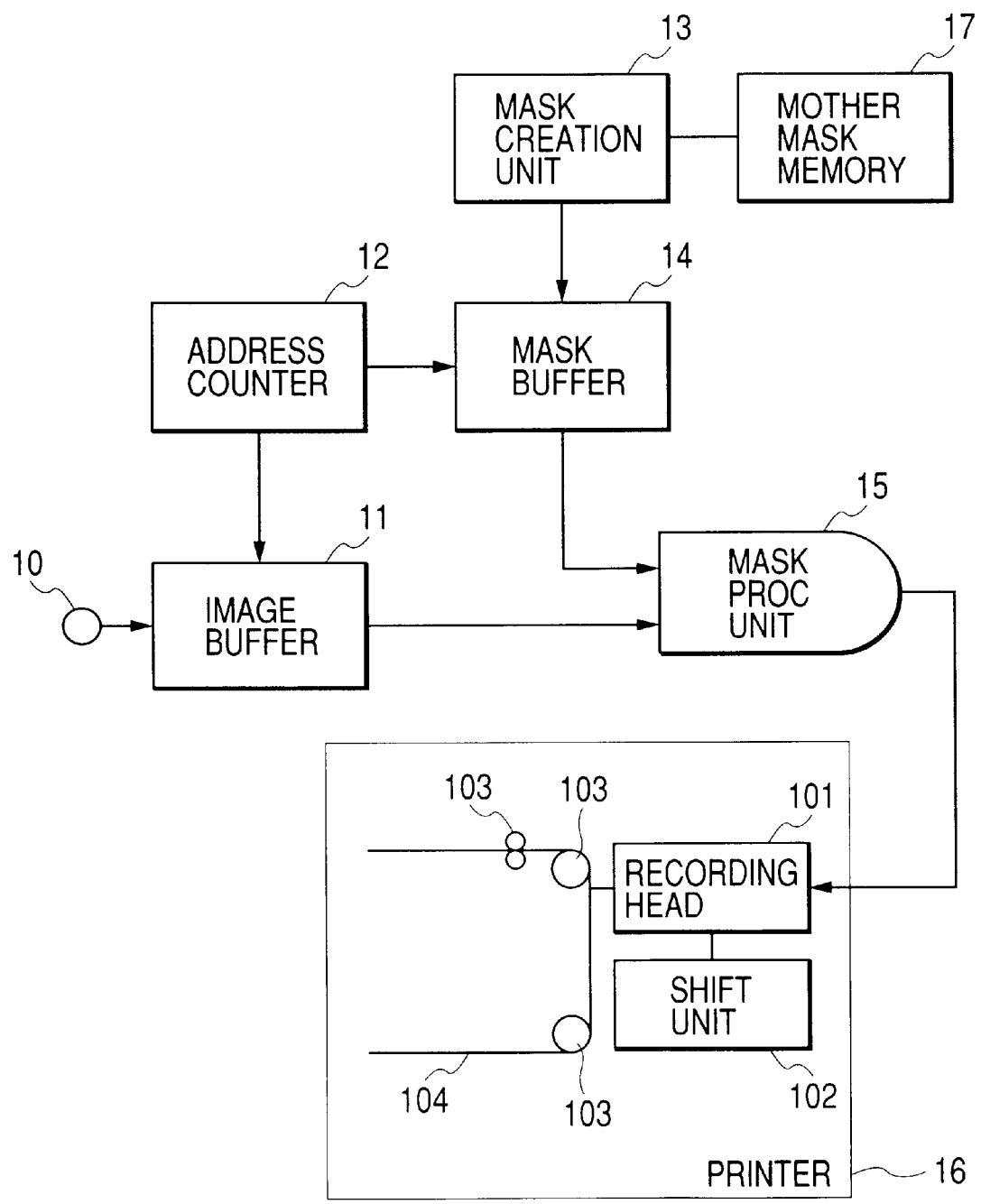
FIG. 1 is a block diagram showing a structural example of an image recording apparatus according to the first embodiment of the present invention.

FIG. 1 is a block diagram showing a structure of an image recording apparatus according to the first embodiment of the present invention. The image recording apparatus according to the first embodiment includes an image data input terminal 10, an image buffer 11, an address counter 12, a mask creation unit 13 (i.e., a mask creation means, and a thinning means), a mask buffer 14, a mask processing unit 15, a printer 16 (i.e., a printing means) which has a recording head 101, a shift unit 102 (i.e., a shift means) and a transportation device 103, and a mother mask memory (ROM (read-only memory)) 17 (i.e., a storage means). Numeral 104 denotes a recording medium.

Next, the above structure will be explained in detail. Image data to be printed by the image recording apparatus (i.e., printing target image data) is input to the image data input terminal 10. The image buffer 11 is the buffer which stores the image data to be printed in one-time scan. The address counter 12 is the counter which synchronizes the image data with mask data. The mask creation unit 13 creates the mask data. The mask buffer 14 is the buffer which stores the mask data. The mask processing unit 15 generates a recording head driving signal on the basis of the image data and the mask data. The printer 16 forms the image on the recording medium 104 in response to the recording head driving signal, and the details of the printer 16 will be described later. The mother mask memory 17 is the memory which has previously stored mother mask data generated by another device.

The printer 16 relatively shifts the recording head 101 longitudinally and laterally with respect to the recording medium 104, thereby forming the image on the recording medium 104. The recording head 101 is composed of plural recording elements, and each recording element discharges ink in an inkjet method to the recording medium 104, thereby forming the image. The shift unit 102 is the mechanism to shift the recording head 101, and the transportation device 103 is the mechanism to transport the recording medium 104.

In such the printer, appearance of striped density unevenness on the image which originates in dispersion of arrangement and characteristics of the recording elements, or mechanical accuracy of the shift unit 102 and the transportation device 103 can not be avoided.

Figure 2:
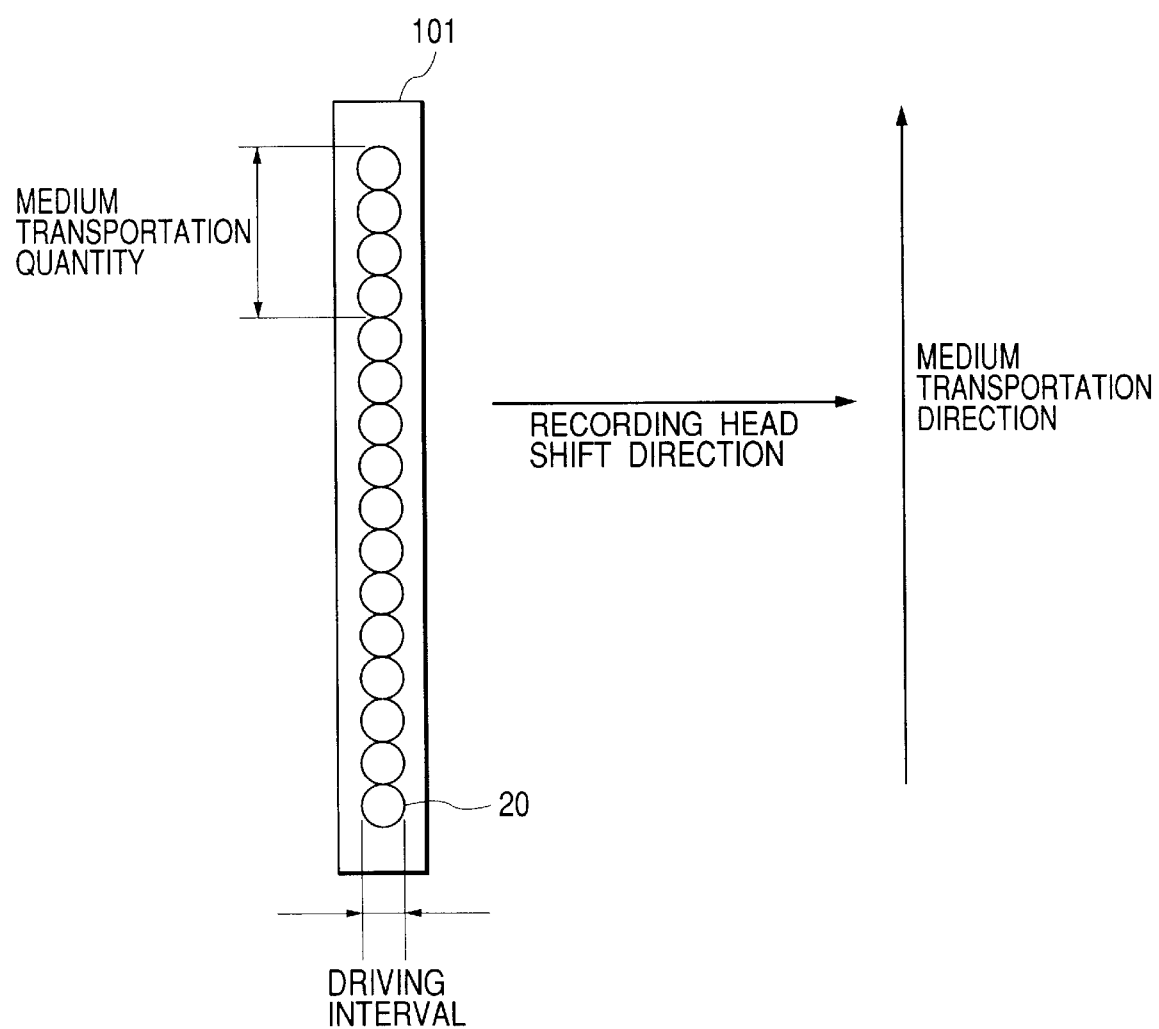
FIG. 2 is an explanation diagram showing a structural example of a recording element in a recording head of the image recording apparatus according to the first to third embodiments of the present invention.

FIG. 2 is an explanation diagram showing a structural example of the recording head 101 of the image recording apparatus according to the first embodiment of the present invention. In FIG. 2, to simplify the explanation, the recording head having the structure that the recording elements are aligned in the recording medium transportation direction is shown. However, the number and the arrangement of the recording elements are arbitrary. For example, it is possible to adopt a structure that plural lines of recording elements are arranged and a structure that recording elements are arranged zigzag.

In FIG. 2, numeral 20 denotes a recording element. For example, the 16 recording elements 20 are arranged at certain intervals along the longitudinal direction of the recording head 101. The recording head 101 drives each recording element 20 at a certain driving interval with respect to the recording medium 104 while shifting from the left to the right in FIG. 2, thereby recording the image on the recording medium 104. After the one-time scan ended, the recording head 101 is returned to the left, and simultaneously the recording medium 104 is transported by a certain quantity. By repeating the above processes, the image is recorded.

By reducing the transportation quantity of the recording medium 104 at each scan as compared with the number of recording elements 20 of the recording head 101, printing in a multipass recording method is performed.

In the present embodiment, a case where the transportation quantity of the recording medium 104 at each scan is set to be ¼ of the number of recording elements 20 of the recording head 101 will be explained. It should be noted that the transportation quantity of the recording medium 104 is not limited to the above case.

Figure 18:
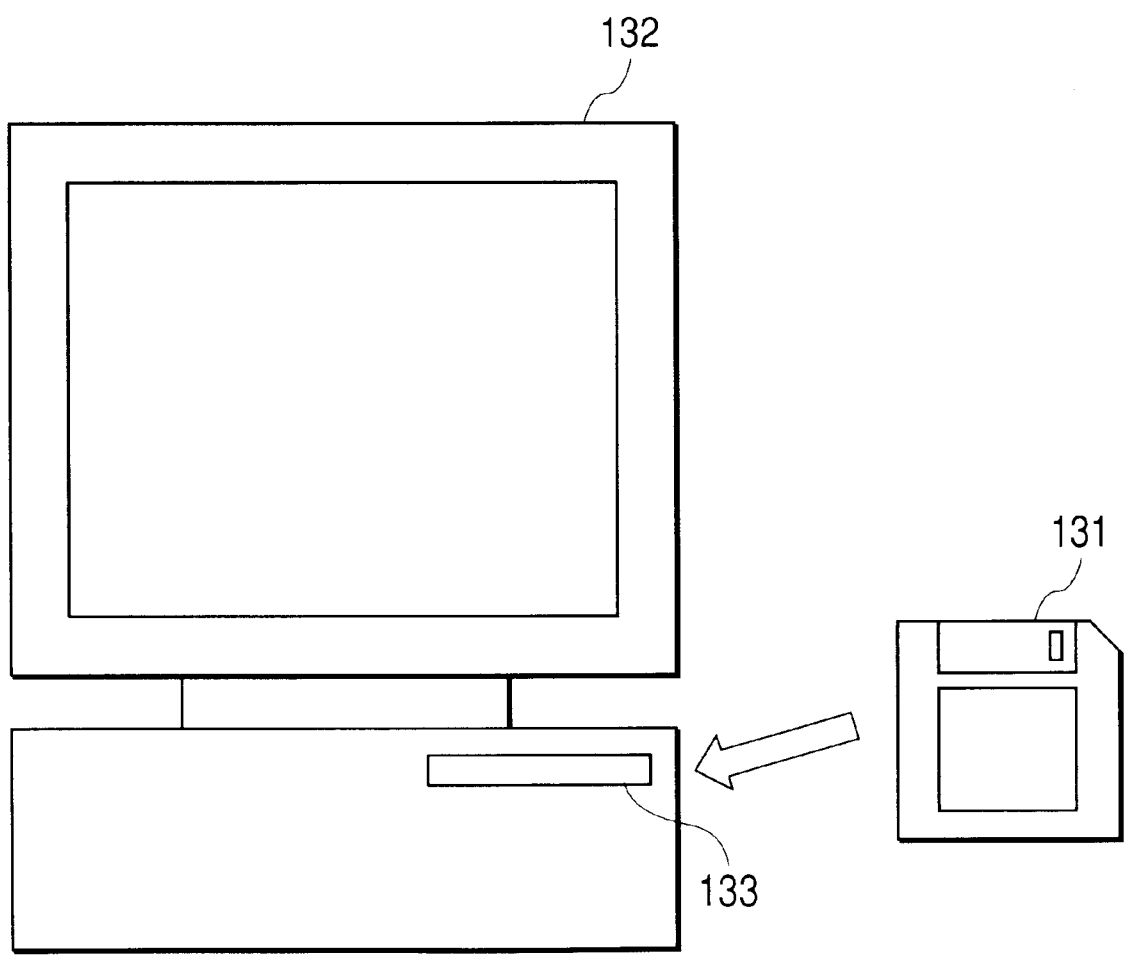
FIG. 18 is an explanation diagram showing an ideal example that the program and the relative data necessary to execute the image recording control method according to the present invention are supplied from the storage medium to the apparatus.

FIG. 18 is an explanation diagram showing an ideal example that a program and relative data necessary to execute the image recording control method according to the present invention are supplied from a storage medium to the apparatus. The program and the relative data necessary to execute the image recording control method of the present invention are supplied by inserting a storage medium 131 such as a floppy disk, a CD-ROM (compact disk read-only memory) or the like into a storage medium driving insertion slit 133 of an apparatus 132. After then, the program and the relative data are once installed from the storage medium 131 to a hard disk and then loaded therefrom to a RAM (random-access memory), or directly loaded from the storage medium 131 to the RAM without being installed in the hard disk, whereby the program and the relative data can be processed and executed.

In a case where the program to execute the image recording control method of the present invention in the image recording apparatus according to the first to third embodiments, for example, the program and the relative data are supplied to the image recording apparatus in the procedure explained with reference to FIG. 18, or the program and the relative data have been previously stored in the image recording apparatus, whereby the program can be executed.

Figure 7:
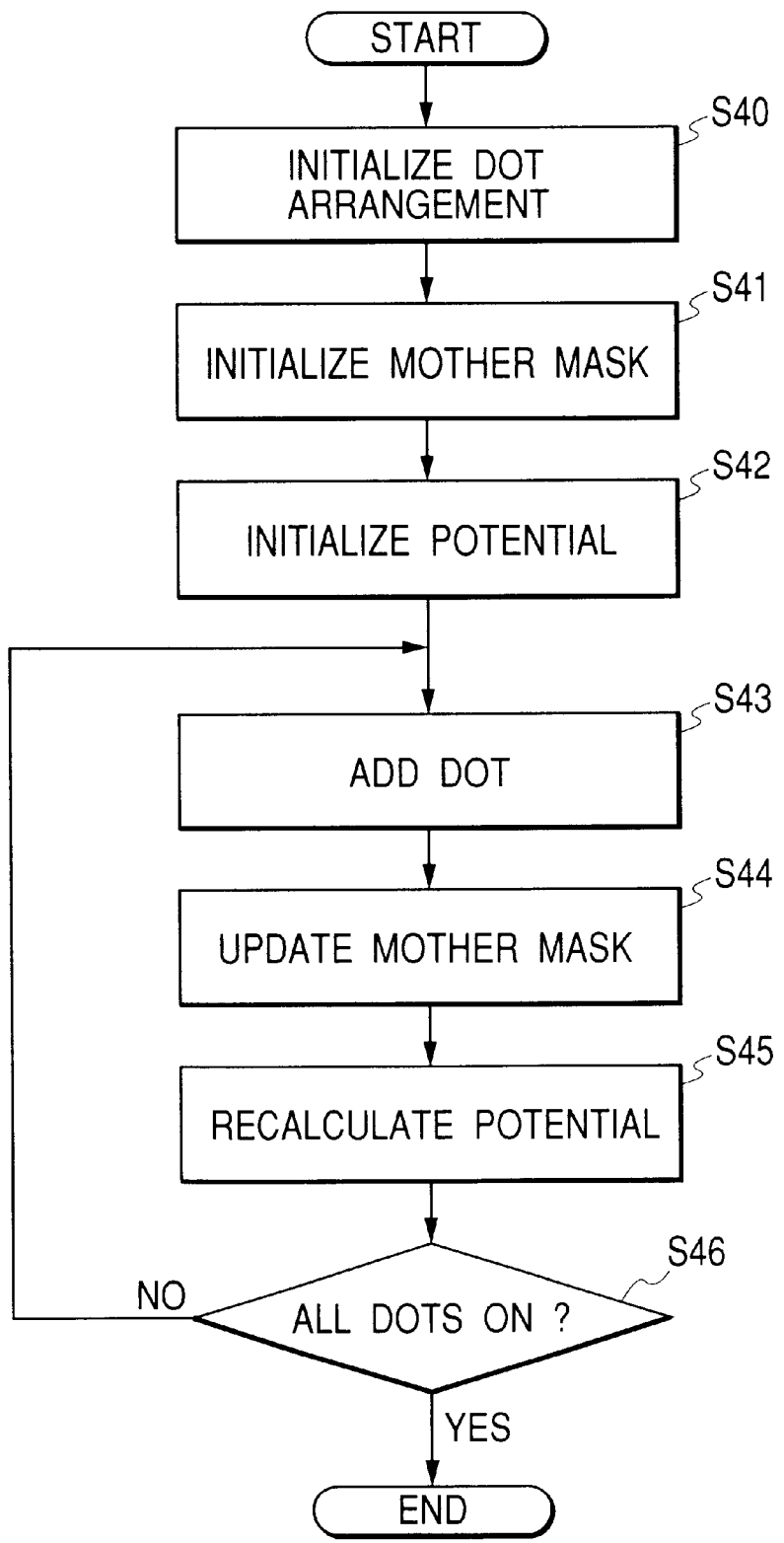
FIG. 7 is a flow chart showing a procedure to create a mother mask pattern in the image recording apparatus according to the embodiment of the present invention.
Figure 17:
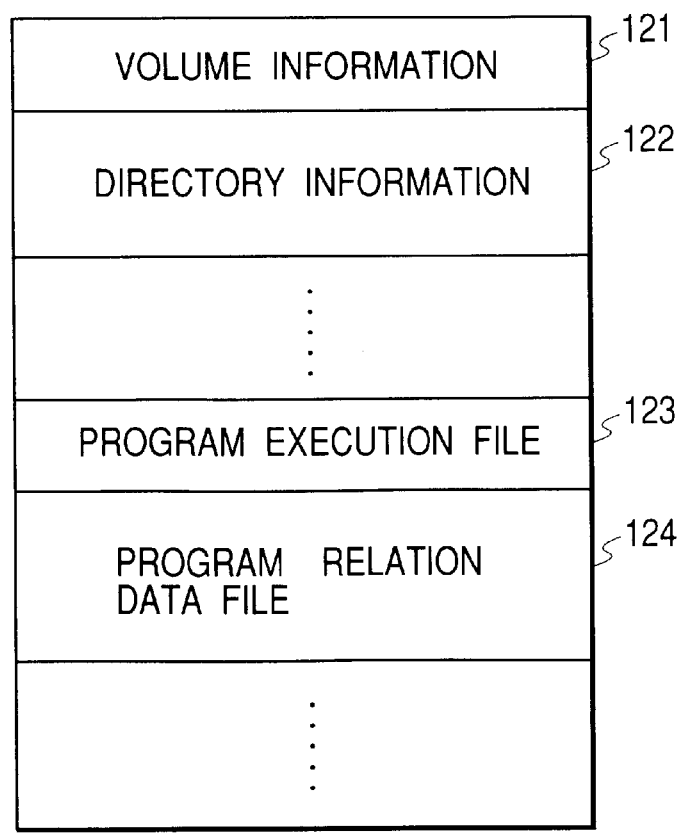
FIG. 17 is an explanation diagram showing an example of contents of a recording medium which stores a program and relative data necessary to execute an image recording control method according to the present invention.

FIG. 17 is an explanation diagram showing an example of the contents of the recording medium which stores the program and the relative data necessary to execute the image recording control method according to the, present invention. The contents of the storage medium include, e.g., volume information 121, directory information 1222, a program execution file 123, a program relation data file 124 and the like. The program to execute the image recording control method of the present invention has been program-coded on the basis of the operation procedure of the first embodiment (FIGS. 7 and 9), the operation procedure of the second embodiment and the operation procedure of the third embodiment (FIG. 15) all described later.

Next, the operation of the image recording apparatus according to the first embodiment of the present invention will be explained in detail with reference to FIGS. 1 to 8.

FIGS. 3 to 6 are diagrams for explaining the procedure that a recording head control signal is generated from the image buffer 11 and the mask buffer 14 to the mask processing unit 15 of the image recording apparatus according to the first embodiment. The image buffer 11 is the memory which can record a block of pixels of which the number of lateral pixels is the same as the number of lateral pixels capable of being printed and of which the number of longitudinal pixels is the same as the number of recording pixels of the recording head 101. In FIGS. 3 to 6, the number of lateral pixels is shown as "16" for the convenience of explanation. However, the number of lateral pixels of the image buffer 11 is actually the same as the number of pixels capable of being printed laterally on the recording medium 104. For example, if a lateral width of an area on the recording medium 104 at which the pixels can be recorded or printed is eight inches and the resolution of the printer 16 is 600 dpi (dots per inch), the number of lateral pixels capable of being recorded or printed is "4800".

In FIGS. 3 to 6, each of small squares (simply called a square hereinafter) corresponds to each pixel, a white square 30 represents that any pixel is not yet recorded, and a black square 31 represents that the pixel has been recorded. It is assumed that the size of the mask buffer 14 is laterally 16 pixels and longitudinally 16 pixels being the same as the number of recording elements of the recording head 101.

Figure 3:
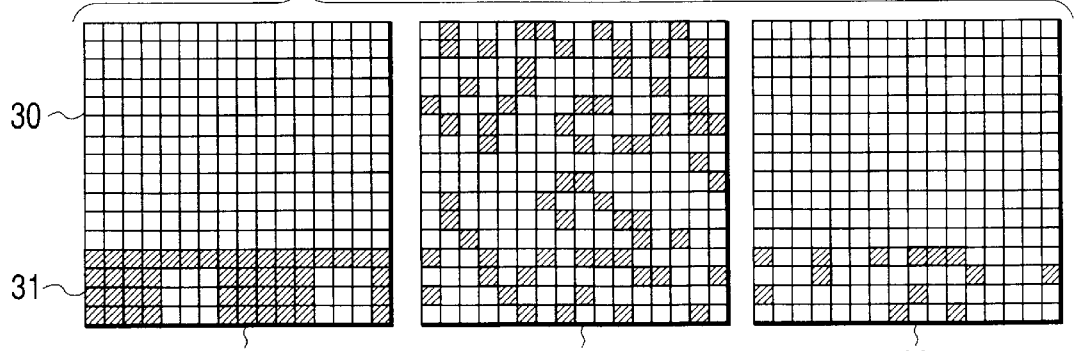
FIG. 3 is an explanation diagram showing an example of a mask pattern and a concrete example of a mask process in the image recording apparatus according to the first to third embodiments of the present invention.

FIG. 3 is the explanation diagram showing a mask process for creating and generating the recording head control signal in a first scan. In the first scan, the image data of the four pixels from the top of the input image are stored in the area of the four pixels from the bottom of the image buffer 11. Next, an AND operation is performed between a first mask pattern 32 created by the mask creation unit 13 and each pixel of the image buffer 11 in accordance with a later-described procedure, thereby generating a recording head driving signal 33. Namely, both the image buffer 11 and the mask pattern 32 drive only the recording elements corresponding to the pixels in the recording state.

Figure 4:
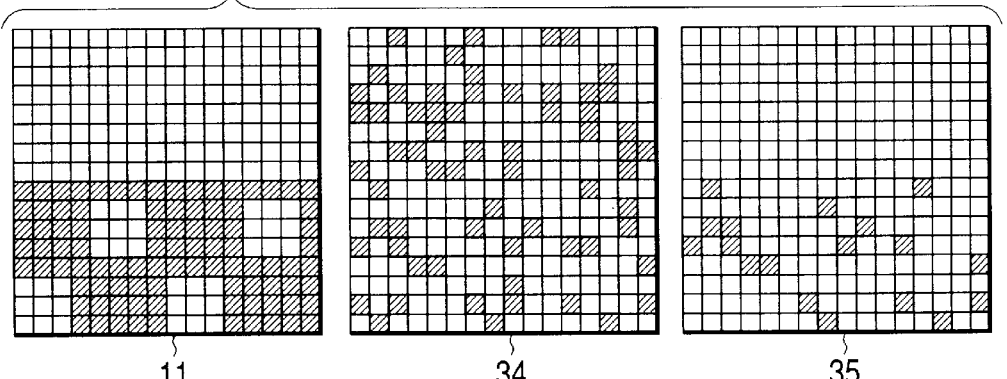
FIG. 4 is an explanation diagram showing an example of the mask pattern and a concrete example of the mask process in the image recording apparatus according to the first to third embodiments of the present invention.

FIG. 4 is the explanation diagram showing the mask process for creating and generating the recording head driving signal in a second scan. After the first scan ended, the transportation device 103 of the printer 16 feeds and transports the sheet by ¼ of the number of recording elements in the recording head 101, i.e., by four pixels. Therefore, the contents of the image buffer 11 are shifted upward by four pixels, and additional data of four pixels are newly obtained from the image data input terminal 10 and stored in the image buffer 11. FIGS. 3 to 6 show that, for the convenience of explanation, the image data are shifted. However, if the image buffer 11 has been structured as a ring buffer, image data shift in the buffer can be handled only by changing the address counter 12, whereby it is convenient. Next, the AND operation is performed between a second mask pattern 34 created by the mask creation unit 13 and each pixel of the image buffer 11 in accordance with the later-described procedure, thereby generating a recording head driving signal 35.

Figure 5:
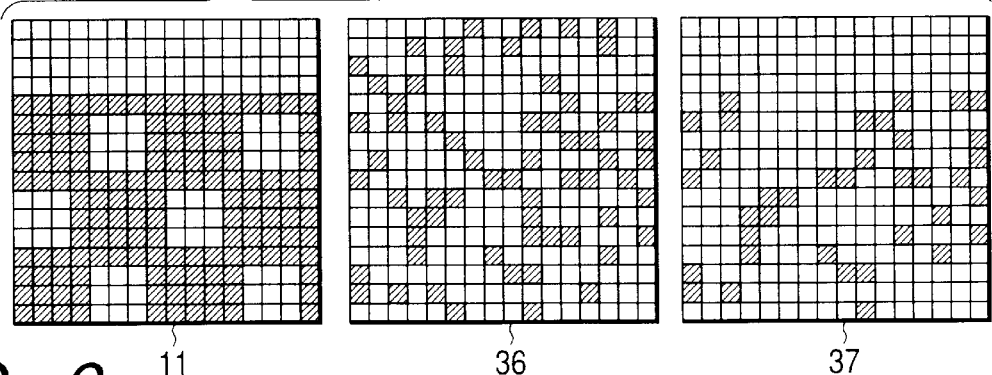
FIG. 5 is an explanation diagram showing an example of the mask pattern and a concrete example of the mask process in the image recording apparatus according to the first to third embodiments of the present invention.

FIG. 5 is the explanation diagram showing the mask process for creating and generating the recording head driving in a third scan. After the second scan ended, the transportation device 103 of the printer 16 feeds and transports the sheet by ¼ of the number of recording elements in the recording head 101, i.e., by four pixels. Therefore, the contents of the image buffer 11 are shifted upward by four pixels, and additional data of four pixels are newly obtained from the image data input terminal 10 and stored in the image buffer 11. Next, the AND operation is performed between a third mask pattern 36 created by the mask creation unit 13 and each pixel of the image buffer 11 in accordance with the later-described procedure, thereby generating a recording head driving signal 37.

Figure 6:
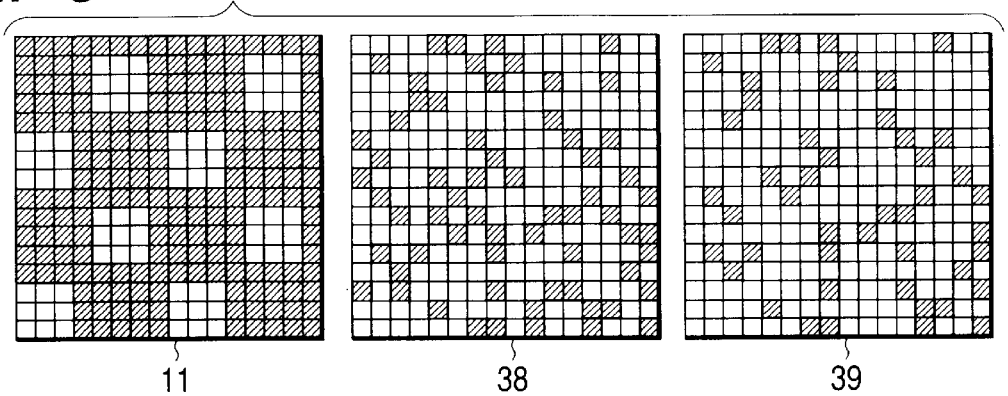
FIG. 6 is an explanation diagram showing an example of the mask pattern and a concrete example of the mask process in the image recording apparatus according to the first to third embodiments of the present invention.

FIG. 6 is the explanation diagram showing the mask process for creating and generating the recording head driving in a fourth scan. After the third scan ended, the transportation device 103 of the printer 16 feeds and transports the sheet by ¼ of the number of recording elements in the recording head 101, i.e., by four pixels. Therefore, the contents of the image buffer 11 are shifted upward by four pixels, and additional data of four pixels are newly obtained from the image data input terminal 10 and stored in the image buffer 11. Next, the AND operation is performed between a fourth mask pattern 38 created by the mask creation unit 13 and each pixel of the image buffer 11 in accordance with the later-described procedure, thereby generating a recording head driving signal 39.

By the above four scans, a printing process to the data of the four pixels from the top of the image ends. After then, the printing process for the entire image is performed by repeating the similar processes. It should be noted that, in a fifth scan, since the printing process to the data of the four pixels from the top of the image has already ended, the data of the four pixels from the top of the image buffer are discarded. Instead, the additional data of the four pixels are stored in a newly appeared vacant area.

Next, a procedure to create the mother mask data to be stored in the mother mask memory 17 of FIG. 1 will be explained with reference to a flow chart shown in FIG. 17. In the present embodiment, it is assumed that the size of the mother mask is laterally 16 pixels and longitudinally 16 pixels. First, one dot arrangement of a first level is determined at random (step S40). Here, it is assumed that the first dot position is given as (x0, y0). Next, the mother mask data is initialized (step S41). Namely, it is assumed that the mask value at the first dot position (x0, y0) is "254" and other mask values are "255". Next, potential is initialized (step S42). It is assumed that the potential is given with respect to a distance r from the dot position, by a following function f(r).

$$f(r) = -0.41r + 1.21 \ (r<2)$$

$$f(r) = 2.76 \exp(-r) (2 \leq r < 10)$$

$$f(r) = 0 \ (r \geq 10)$$

Therefore, a potential P(x, y) with respect to the mask position (x, y) based on the dot position (x0, y0) is given by a following expression.

$$P(x, y) = f\left(\sqrt{\{(x-x0+16)\%16\}^2 + \{(y-y0+16)\%16\}^2}\right)$$

$$x0-10<x<x0+10$$

$$y0-10<y<y0+10$$

Next, the position where the potential is minimum is searched, and the dot is added at the searched position (step S43). If there are the plural positions where the potential is minimum, one position is selected at random. Next, the mask value corresponding to all the dot positions including the newly added dot is decreased by one (step S44), and the potential for the newly added dot is added (step S45). If it is assumed that the dot position of the newly added dot is given as (x1, y1), the new potential is given by the following expression.

$$P(x, y) = f\left(\sqrt{\{(x-x1+16)\%16\}^2 + \{(y-y1+16)\%16\}^2}\right)$$

$$x1-10<x<x1+10$$

$$y1-10<y<y1+10$$

The processes in the steps S43, S44 and S45 are repeated until the dots are added to all the pixel positions of the mother mask (step S46), whereby the mother mask is created. By such the procedure as above, a visually preferable pseudo periodic mask arrangement in which the mask values are uniformly dispersed can be created.

Namely, the pseudo periodic mask arrangement (i.e., pseudo-periodically arranged mother mask data) is created by repeating a process of obtaining initial recording pixel positions at random, giving certain repulsion potentials to all the obtained recording pixel positions, and setting a new recording pixel to the pixel position at which the sum of the potentials is minimum, until the recording pixels are set for all the pixels. Here, the repulsion potential is represented by a function which attenuates according to the position from the recording pixel.

FIG. 8 shows an example of the mother mask.

It should be noted that it is unnecessary to incorporate a means for creating the mother mask into the image recording apparatus. Namely, it is assumed that the mother mask is previously created by an independent mother mask creation device, and the thus obtained mother mask is stored in the mother mask memory 17 of the image recording apparatus.

Figure 9:
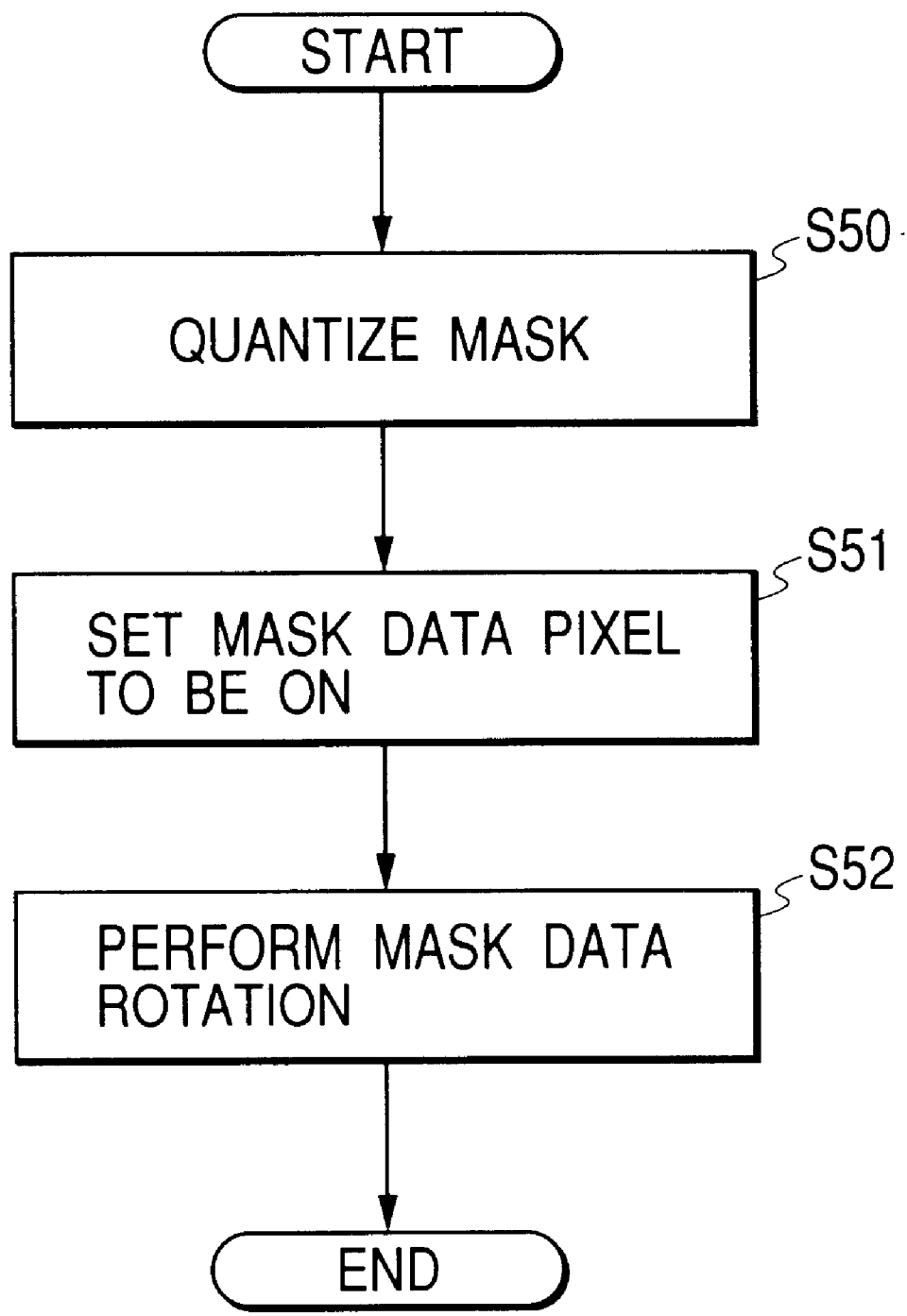
FIG. 9 is a flow chart showing a procedure to create the mask in the image recording apparatus according to the first embodiment of the present invention.

Next, a procedure by the creation unit 13 of the image recording apparatus to create and generate the mask patterns (i.e., mask data) 32, 34, 36 and 38 stored in the mask buffer 14 will be explained with reference to a flow chart shown in FIG. 9. The mother mask is composed of lateral 16 pixels and longitudinal 16 pixels, and each mask value is given within a range of "0" to "255". First, the mask data is quantized plural times corresponding to the number of times of scans in the multipass recording method (step S50). Namely, in the present embodiment, since the multipass printing based on four-time scans is performed, the mask values "0" to "63" are allocated to a first pass, the mask values "64" to "127" are allocated to a second pass, the mask values "128" to "191" are allocated to a third pass, and the mask values "192" to "255" are allocated to a fourth pass.

Next, the pixels of the mask data corresponding to each pass are set to be on (step S51). Namely, the pixel positions allocated to the first pass are turned on in case of creating the mask data 32, the pixel positions allocated to the second pass are turned on in case of creating the mask data 34, the pixel positions allocated to the third pass are turned on in case of creating the mask data 36, and the pixel positions allocated to the fourth pass are turned on in case of creating the mask data 38. Next, rotation of the mask data is performed in correspondence with a transportation quantity in each pass (step S52). Namely, the mask data 34 is shifted upward by four pixels with respect to the mother mask, and the four-pixel data overflowing up is then shifted to the lower side (rotation of four pixels). The mask data 36 is shifted upward by eight pixels with respect to the mother mask, and the eight-pixel data overflowing up is then shifted to the lower side (rotation of eight pixels). The mask data 38 is shifted upward by 12 pixels with respect to the mother mask, and the 12-pixel data overflowing up is shifted to the lower side (rotation of 12 pixels).

Hereinafter, the methods of creating the mask data 32, 34, 36 and 38 will be concretely explained.

FIG. 10 shows the mask data 32 for the first pass.

The mask data 32 of FIG. 10 is given by setting, in the data of the mask values "0" to "255" in the mother mask of FIG. 8, the data of the mask values "0" to "63" to be "1". The rotation is unnecessary with respect to the mask data for the first pass.

FIG. 11 shows the mask data 34 for the second pass.

The mask data 34 of FIG. 11 is given by setting, in the data of the mask values "0" to "255" in the mother mask of FIG. 8, the data of the mask values "64" to "127" to be "1", and then performing the rotation of four pixels upward.

FIG. 12 shows the mask data 36 for the third pass.

The mask data 36 of FIG. 12 is given by setting, in the data of the mask values "0" to "255" in the mother mask of FIG. 8, the data of the mask values "128" to "191" to be "1", and then performing the rotation of eight pixels upward.

FIG. 13 shows the mask data 38 for the fourth pass.

The mask data 38 of FIG. 13 is given by setting, in the data of the mask values "0" to "255" in the mother mask of FIG. 8, the data of the mask values "192" to "255" to be "1", and then performing the rotation of eight pixels upward.

As described above, in the image recording apparatus according to the first embodiment of the present invention, the mask creation unit 13 creates, as the thinning pattern in the multipass recording method, the mask pattern from the pseudo periodic mask arrangement of high dot dispersibility that the arrangement of the non-recording pixels and the recording pixels becomes visually preferable when the binarization is performed at the arbitrary level, whereby the following operations and effects can be obtained.

In the above structure, since the low frequency components of the mother mask data of the pseudo periodic mask arrangement is less as compared with the uniform random number, it prevents the generation of repetitive pattern and the deterioration of graininess. Namely, by using the mother mask data of the pseudo periodic mask arrangement of high dot dispersibility, the repetitive pattern generated when the short-period random number is used and the graininess deteriorated when the uniform random number is used can be prevented.

Second Embodiment

Figure 14:
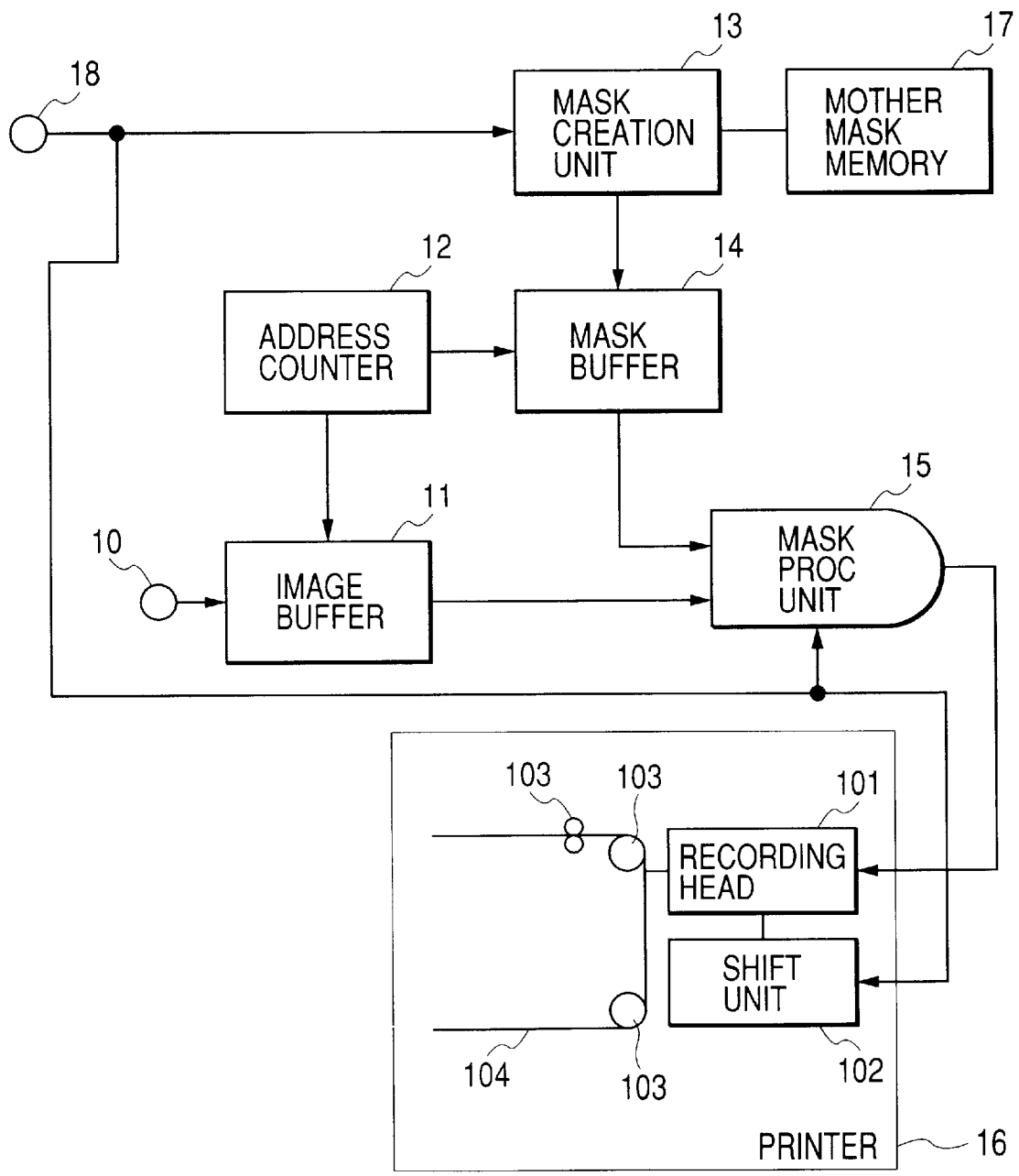
FIG. 14 is a block diagram showing a structural example of the image recording apparatus according to the second and third embodiments of the present invention.

FIG. 14 is a block diagram showing a structure of an image recording apparatus according to the second embodiment of the present invention. The image recording apparatus according to the second embodiment includes an image data input terminal 10, an image buffer 11, an address counter 12, a mask creation unit 13, a mask buffer 14, a mask processing unit 15, a printer 16 which has a recording head 101, a shift unit 102 and a transportation device 103, a mother mask memory (ROM) 17, and a printing mode setting terminal 18.

The above structure according to the second embodiment is obtained by adding the printing mode setting terminal 18 to the structure according to the first embodiment. The printing mode setting terminal 18 is the terminal through which a signal to change printing control according to a kind of recording medium 104 (a common sheet, a coated sheet, a gloss sheet, etc.) set in the printer 16 and priority of printing quality/printing speed is input. The printer 16 changes the number of multipass operations, an operation of the recording head 101 and an operation of the transportation device 103, in accordance with a printing mode. Since the structures other than the above are the same as those in the first embodiment, the explanation thereof is omitted.

Next, the operation of the image recording apparatus according to the second embodiment of the present invention will be explained in detail with reference to FIGS. 2, 9 and 14.

For example, in a coated sheet mode, it can be controlled to perform such four-pass one-way printing as explained in the first embodiment. Further, in a common sheet mode, it can be controlled to perform two-pass two-way printing (i.e., the multipass operation is performed twice, and printing is also performed while the recording head 101 is being returned from the right to the left in FIG. 2). In this case, the mask creation unit 13 quantizes the mask in accordance with the frequency (i.e., the number of times) of the multipass operations (step S50 of FIG. 9), changes a rotation quantity of the mask data in accordance with a shift quantity of the recording medium 104 for each pass operation, and thus creates the mask pattern.

Namely, in the four-pass operation, the masks shown in FIGS. 10 to 13 are created. In the two-pass operation, the mask which is obtained by setting, in the data of the mask values "0" to "255" in the mother mask of FIG. 8, the data of the mask values "0" to "127" to be "1" is created and used, and also the mask which is obtained by setting, in the data of the mask values "0" to "255" in the mother mask of FIG. 8, the data of the mask values "128" to "255" to be "1" and then performing the rotation of eight pixels upward is created and used.

As described above, in the image recording apparatus according to the second embodiment of the present invention, since the mask pattern can be created from the one mother mask data even if there are the plural printing modes, a memory capacity necessary to store the masks can be reduced as compared with a case where the mask patterns corresponding to the number of the plural printing modes are prepared beforehand.

Third Embodiment

As well as the image recording apparatus according to the above second embodiment, the image recording apparatus according to the third embodiment of the present invention includes an image data input terminal 10, an image buffer 11, an address counter 12, a mask creation unit 13, a mask buffer 14, a mask processing unit 15, a printer 16 which has a recording head 101, a shift unit 102 and a transportation device 103, a mother mask memory (ROM) 17, and a printing mode setting terminal 18 (FIG. 14).

In the present embodiment, if it is designated to use a recording medium such as a common sheet, a coated sheet or the like which has relatively high ink absorbency, the operation of the mask creation unit 13 of the image recording apparatus can be partially changed. For example, a multipass recording method for such the recording medium of relatively high ink absorbency is disclosed in Japanese Patent Application (Laid-Open) No. 6-143618. Namely, it has been known that, in this method, a recording pixel ratio (a ratio of non-recording pixels and recording pixels) at the edge of the recording head 101 is set to be lower than that at the center of the recording head 101, whereby an unfavorable stripe appearing at the boundary of the adjacent passes can be reduced. In the present embodiment, the recording pixel ratio can be easily changed according to a following procedure.

That is, the operation of the image recording apparatus according to the third embodiment of the present invention will be next explained in detail with reference to FIGS. 14 to 16.

Figure 15:
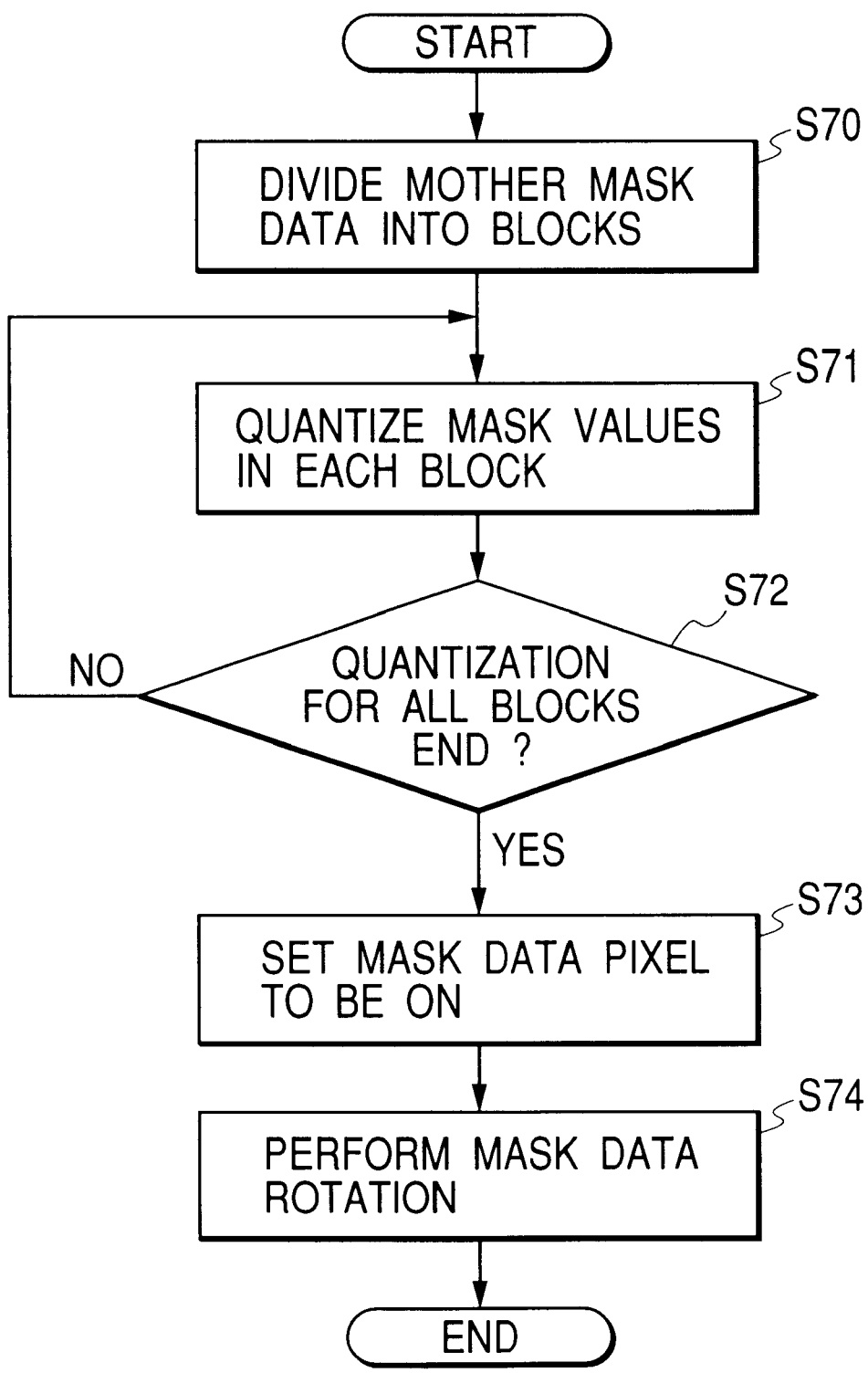
FIG. 15 is a flow chart showing a procedure to create the mask pattern for arbitrarily designating a recording pixel ratio in the recording apparatus according to the third embodiment of the present invention.

FIG. 15 is a flow chart showing the procedure to create the mask pattern in the mask creation unit 13 for arbitrarily designating the recording pixel ratio. Here, a case where the mask pattern is divided into four blocks 80 to 83 as shown in FIG. 16, the recording pixel ratio in each of the blocks 80 and 83 corresponding to both the edges of the recording head 101 is set to be, e.g., 20%, and the recording pixel ratio in each of the blocks 81 and 82 corresponding to the center of the recording head 101 is set to be, e.g., 30% will be explained. However, it should be noted that the recording pixel ratio is not limited to them.

Figure 16:
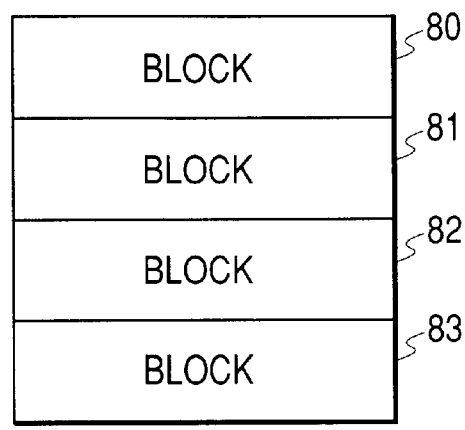
FIG. 16 is a diagram showing the mask pattern divided into four blocks in the recording apparatus according to the third embodiment of the present invention.

First, the mother mask data shown in FIG. 8 is divided into the four blocks shown in FIG. 16 (step S70). Namely, it is assumed that the block 80 includes the longitudinal a to d pixels, the block 81 includes the longitudinal e to h pixels, the block 82 includes the longitudinal i to l pixels, and the block 83 includes the longitudinal m to p pixels. Then, the mask value is quantized for each block (step S71).

With respect to the part of the block 80, the mask values "0" to "50" are allocated to the first pass, the mask values "51" to "127" are allocated to the second pass, the mask values "128" to "204" are allocated to the third pass, and the mask values "205" to "255" are allocated to the fourth pass.

With respect to the part of the block 81, the mask values "0" to "76" are allocated to the first pass, the mask values "77" to "153" are allocated to the second pass, the mask values "154" to "204" are allocated to the third pass, and the mask values "205" to "255" are allocated to the fourth pass.

With respect to the part of the block 82, the mask values "0" to "76" are allocated to the first pass, the mask values "77" to "127" are allocated to the second pass, the mask values "128" to "178" are allocated to the third pass, and the mask values "179" to "255" are allocated to the fourth pass.

With respect to the part of the block 83, the mask values "0" to "50" are allocated to the first pass, the mask values "51" to "102" are allocated to the second pass, the mask values "103" to "178" are allocated to the third pass, and the mask values "179" to "255" are allocated to the fourth pass.

If the quantization for all the blocks ends, the flow advances to a next step (step S72). Then, the pixel of the mask data corresponding to each pass is turned on (step S73). Namely, the pixel positions allocated to the first pass are turned on in case of creating the mask data 32, the pixel positions allocated to the second pass are turned on in case of creating the mask data 34, the pixel positions allocated to the third pass are turned on in case of creating the mask data 36, and the pixel positions allocated to the fourth pass are turned on in case of creating the mask data 38.

Next, rotation of the mask data is performed in correspondence with a transportation quantity in each pass (step S74). Namely, the mask data 34 is shifted upward by four pixels with respect to the mother mask, the four-pixel data overflowing up is then shifted to the lower side (rotation of four pixels). The mask data 36 is shifted upward by eight pixels with respect to the mother mask, and the eight-pixel data overflowing up is then shifted to the lower side (rotation of eight pixels). The mask data 38 is shifted upward by 12 pixels with respect to the mother mask, and the 12-pixel data overflowing up is shifted to the lower side (rotation of 12 pixels).

As described above, in the image recording apparatus according to the third embodiment of the present invention, it is possible to create the mask pattern by which the recording pixel ratio at the edge of the recording head 101 is set to be lower than that at the center of the recording head 101. Thus, it is possible to reduce the unfavorable stripe appearing at the boundary of the adjacent passes on the recording medium of relatively high ink absorbency.

Other Embodiments

In the above first to third embodiments of the present invention, the single image recording apparatus was explained by way of example, but the present invention is not limited to this. Namely, the present invention is applicable to a system in which the image recording apparatus, an information processing apparatus such as a personal computer or the like to supply the mother mask data to the image recording apparatus, an image reading apparatus such as a scanner or the like to read an original data to be recorded by the image recording apparatus, and the like are arbitrarily connected with others through a communication medium.

Thus, the present invention is applicable to a system which consists of plural devices, or to an apparatus which consists of a single device.

It is needless to say that the object of the present invention can be achieved in a case where a storage medium recording program codes of software to realize the functions of the above embodiments is supplied to a system or an apparatus, and then a computer (or CPU or MPU) in the system or the apparatus reads and executes the stored program codes.

In this case, the program codes themselves read from the storage medium execute the functions of the above embodiments, whereby the storage medium storing these program codes constitutes the present invention. As the storage medium from which the program codes are supplied, e.g., a floppy disk, a hard disk, an optical disk, a magnetooptical disk, a CD-ROM, a CD-R, a magnetic tape, a nonvolatile memory card, a ROM, downloading or the like can be used.

Further, it is needless to say that the present invention includes not only the case where the functions of the above embodiments are executed by the program codes read by the computer, but also a case where an OS (operating system) or the like running on the computer executes a part or all of the actual processes based on instructions of the program codes and thus the functions of the above embodiment are executed by such processes.

Further, it is needless to say that the present invention includes a case where the program codes read from a medium such as the storage medium are once written in a memory provided in a function expansion board inserted in the computer or a function expansion unit connected to the computer, and then a CPU or the like provided in the function expansion board or the function expansion unit performs all or a part of the actual processes based on instructions of the program codes, whereby the functions of the above embodiments are achieved by such processes.

As described above, according to the image recording apparatus of the present invention, the mask pattern having the visually preferable dot arrangement is created from the pseudo periodic mask arrangement. Thus, as compared with the mask pattern based on the random number, it is possible to reduce the generation of repetitive pattern and the deterioration of graininess. Further, since the mask creation means can create the plural mask patterns according to the printing modes, the memory capacity necessary to store the mask patterns can be reduced.

Further, according to the image recording control method of the present invention, as well as the image recording apparatus, by repeating the image recording control method in the image recording apparatus, it is possible to reduce the generation of repetitive pattern and the deterioration of graininess as compared with the mask pattern based on the random number. Further, the memory capacity necessary to store the mask patterns can be reduced.

Further, according to the storage medium of the present invention, if the image recording control method is read from the storage medium and then executed by the image recording apparatus, it is possible to reduce the generation of repetitive pattern and the deterioration of graininess as compared with the mask pattern based on the random number. Further, the memory capacity necessary to store the mask patterns can be reduced.

The present invention can be applied to a system constituted by plural devices or to an apparatus comprising a single device. Furthermore, it goes without saying that the present invention is applicable also to a case where the object of the present, invention is attained by supplying the program to the system or the apparatus.

As many apparently widely different embodiments of the present invention can be made without departing from the spirit and scope thereof, it is to be understood that the present invention is not limited to the specific embodiments thereof except as defined in the appended claims.

What is claimed is:

1. An image recording apparatus which divides a recording head having plural recording elements into plural areas, performs plural-time scans to an identical area on a recording medium such as a sheet by using the same or different areas of said divided recording head, and creates a thinned-out image according to a thinning pattern in each scan to complete an entire image, said apparatus comprising:

mask creation means for creating plural mask patterns from a pseudo periodic mask arrangement that an arrangement of non-recording pixels and recording pixels becomes visually preferable; and thinning means for thinning out recording data by using the mask patterns as the thinning patterns for respective recording areas by said recording head, wherein said pseudo periodic mask arrangement is created by repeating a process of obtaining initial recording pixel positions at random, giving certain repulsion potentials to all the obtained recording pixel positions, and setting a new recording pixel to the pixel position at which the sum of the potentials is minimum, until the recording pixels are set for all the pixels.

2. An apparatus according to claim 1, wherein the repulsion potential is represented by a function which attenuates according to the position from the recording pixel.

3. An apparatus according to claim 1, further comprising:

shift means for shifting said recording head relatively to the recording medium;

printing means for forming the image on the recording medium through said recording head; and storage means for storing said pseudo periodic mask arrangement.

4. An apparatus according to claim 1, wherein the division of said recording head into the plural areas is performed at least in two or more methods, on the basis of the number of the recording elements of said recording head and a transportation quantity of the recording medium.

5. An apparatus according to claim 1, wherein said mask creation means creates the plural mask patterns in accordance with a printing mode set based on a kind of recording medium and a priority of printing quality/printing speed.

6. An apparatus according to claim 1, wherein said mask creation means can change a ratio of the non-recording pixels and the recording pixels in accordance with the arrangement positions of the recording elements of said recording head.

7. An apparatus according to claim 5, wherein said mask creation means can change a ratio of the non-recording pixels and the recording pixels in accordance with the arrangement positions of the recording elements of said recording head and said printing mode.

8. An image recording apparatus which divides a recording head having plural recording elements into plural areas, performs plural-time scans to an identical area on a recording medium such as a sheet by using the same or different areas of said divided recording head, and creates a thinned-out image according to a thinning pattern in each scan to complete an entire image, said apparatus comprising:

mask creation means for creating plural mask patterns from a pseudo periodic mask arrangement that an arrangement of non-recording pixels and recording pixels becomes visually preferable; and thinning means for thinning out recording data by using the mask patterns as the thinning patterns for respective recording areas by said recording head, wherein said pseudo periodic mask arrangement can be supplied from an apparatus external to said image recording apparatus, and said pseudo periodic mask arrangement has a characteristic that generation of a repetitive pattern and graininess can be suppressed because low-frequency components are few, as compared with an arrangement based on a random number.

9. An image recording control method which is applied to an image recording apparatus which divides a recording head having plural recording elements into plural areas, performs plural-time scans to an identical area on a recording medium such as a sheet by using the same or different areas of the divided recording head, and creates a thinned-out image according to a thinning pattern in each scan to complete an entire image, said method comprising:

a mask creation step of creating plural mask patterns from a pseudo periodic mask arrangement that an arrangement of non-recording pixels and recording pixels becomes visually preferable; and a thinning step of thinning out recording data by using the mask patterns as the thinning patterns for respective recording areas by the recording head, wherein the pseudo periodic mask arrangement is created by repeating a process of obtaining initial recording pixel positions at random, giving certain repulsion potentials to all the obtained recording pixel positions, and setting a new recording pixel to the pixel position at which the sum of the potentials is minimum, until the recording pixels are set for all the pixels.

10. A method according to claim 9, wherein the repulsion potential is represented by a function which attenuates according to the position from the recording pixel.

11. A method according to claim 9, further comprising:
a shift step of shifting the recording head relatively to the recording medium;
a printing step of forming the image on the recording medium through the recording head; and
a storage step of storing the pseudo periodic mask arrangement.

12. A method according to claim 9, wherein the division of the recording head into the plural areas is performed at least in two or more methods, on the basis of the number of the recording elements of the recording head and a transportation quantity of the recording medium.

13. A method according to claim 9, wherein said mask creation step creates the plural mask patterns in accordance with a printing mode set based on a kind of recording medium and a priority of printing quality/printing speed.

14. A method according to claim 9, wherein said mask creation step can change a ratio of the non-recording pixels and the recording pixels in accordance with the arrangement positions of the recording elements of the recording head.

15. A method according to claim 13, wherein said mask creation step can change a ratio of the non-recording pixels and the recording pixels in accordance with the arrangement positions of the recording elements of the recording head and the printing mode.

16. An image recording control method which is applied to an image recording apparatus which divides a recording head having plural recording elements into plural areas, performs plural-time scans to an identical area on a recording medium such as a sheet by using the same or different areas of the divided recording head, and creates a thinned-out image according to a thinning pattern in each scan to complete an entire image, said method comprising:
a mask creation step of creating plural mask patterns from a pseudo periodic mask arrangement that an arrangement of non-recording pixels and recording pixels becomes visually preferable; and
a thinning step of thinning out recording data by using the mask patterns as the thinning patterns for respective recording areas by the recording head,
wherein the pseudo periodic mask arrangement can be supplied from an apparatus external to the image recording apparatus, and
the pseudo periodic mask arrangement has a characteristic that generation of a repetitive pattern and graininess can be suppressed because low-frequency components are few, as compared with an arrangement based on a random number.

17. A computer-readable storage medium which stores a program to execute an image recording control method applicable to an image recording apparatus which divides a recording head having plural recording elements into plural areas, performs plural-time scans to an identical area on a recording medium such as a sheet by using the same or different areas of the divided recording head, and creates a thinned-out image according to a thinning pattern in each scan to complete an entire image, said method comprising:
a mask creation step of creating plural mask patterns from a pseudo periodic mask arrangement that an arrangement of non-recording pixels and recording pixels becomes visually preferable; and
a thinning step of thinning out recording data by using the mask patterns as the thinning patterns for respective recording areas by the recording head,
wherein the pseudo periodic mask arrangement is created by repeating a process of obtaining initial recording pixel positions at random, giving certain repulsion potentials to all the obtained recording pixel positions, and setting a new recording pixel to the pixel position at which the sum of the potentials is minimum, until the recording pixels are set for all the pixels.

18. A storage medium according to claim 17, wherein the repulsion potential is represented by a function which attenuates according to the position from the recording pixel.

19. A storage medium according to claim 17, wherein said method further comprises:
a shift step of shifting the recording head relatively to the recording medium;
a printing step of forming the image on the recording medium through the recording head; and
a storage step of storing the pseudo periodic mask arrangement.

20. A storage medium according to claim 17, wherein the division of the recording head into the plural areas is performed at least in two or more methods, on the basis of the number of the recording elements of the recording head and a transportation quantity of the recording medium.

21. A storage medium according to claim 17, wherein said mask creation step creates the plural mask patterns in accordance with a printing mode set based on a kind of recording medium and a priority of printing quality/printing speed.

22. A storage medium according to claim 17, wherein said mask creation step can change a ratio of the non-recording pixels and the recording pixels in accordance with the arrangement positions of the recording elements of the recording head.

23. A storage medium according to claim 21, wherein said mask creation step can change a ratio of the non-recording pixels and the recording pixels in accordance with the arrangement positions of the recording elements of the recording head and the printing mode.

24. A computer-readable storage medium which stores a program to execute an image recording control method applicable to an image recording apparatus which divides a recording head having plural recording elements into plural areas, performs plural-time scans to an identical area on a recording medium such as a sheet by using the same or different areas of the divided recording head, and creates a thinned-out image according to a thinning pattern in each scan to complete an entire image, said method comprising:
a mask creation step of creating plural mask patterns from a pseudo periodic mask arrangement that an arrangement of non-recording pixels and recording pixels becomes visually preferable; and
a thinning step of thinning out recording data by using the mask patterns as the thinning patterns for respective recording areas by the recording head,
wherein the pseudo periodic mask arrangement can be supplied from an apparatus external to the image recording apparatus, and
the pseudo periodic mask arrangement has a characteristic that generation of a repetitive pattern and graininess can be suppressed because low-frequency components are few, as compared with an arrangement based on a random number.

25. An image recording apparatus which divides a recording head having plural recording elements into plural areas, performs plural-time scans to an identical area on a recording medium such as a sheet by using the same or different areas of said divided recording head, and creates a thinned-out image according to a thinning pattern in each scan to complete an entire image, said apparatus comprising:

mask creation means for creating plural mask patterns from a pseudo periodic mask arrangement that an arrangement of non-recording pixels and recording pixels becomes visually preferable; and thinning means for thinning out recording data by using the mask patterns as the thinning patterns for respective recording areas by said recording head, wherein the pseudo periodic mask arrangement has a characteristic that generation of a repetitive pattern and graininess can be suppressed because low-frequency components are few, as compared with an arrangement based on a random number.

26. An image recording control method which is applied to an image recording apparatus which divides a recording head having plural recording elements into plural areas, performs plural-time scans to an identical area on a recording medium such as a sheet by using the same or different areas of the divided recording head, and creates a thinned-out image according to a thinning pattern in each scan to complete an entire image, said method comprising:

a mask creation step of creating plural mask patterns from a pseudo periodic mask arrangement that an arrangement of non-recording pixels and recording pixels becomes visually preferable; and a thinning step of thinning out recording data by using the mask patterns as the thinning patterns for respective recording areas by the recording head, wherein the pseudo periodic mask arrangement has a characteristic that generation of a repetitive pattern and graininess can be suppressed because low-frequency components are few, as compared with an arrangement based on a random number.

27. A computer-readable storage medium which stores a program to execute an image recording control method applicable to an image recording apparatus which divides a recording head having plural recording elements into plural areas, performs plural-time scans to an identical area on a recording medium such as a sheet by using the same or different areas of the divided recording head, and creates a thinned-out image according to a thinning pattern in each scan to complete an entire image, said method comprising:

a mask creation step of creating plural mask patterns from a pseudo periodic mask arrangement that an arrangement of non-recording pixels and recording pixels becomes visually preferable; and a thinning step of thinning out recording data by using the mask patterns as the thinning patterns for respective recording areas by the recording head, wherein the pseudo periodic mask arrangement has a characteristic that generation of a repetitive pattern and graininess can be suppressed because low-frequency components are few, as compared with an arrangement based on a random number.

* * * * *

UNITED STATES PATENT AND TRADEMARK OFFICE
CERTIFICATE OF CORRECTION

PATENT NO. : 6,669,318 B2
DATED : December 30, 2003
INVENTOR(S) : Ushiroda

It is certified that error appears in the above-identified patent and that said Letters Patent is hereby corrected as shown below:

Column 1,
Line 47, "e.g." should read -- e.g., --.

Column 5,
Line 67, "the," should read -- the --.

Column 13,
Line 34, "present," should read -- present --.

Signed and Sealed this

Twentieth Day of July, 2004

JON W. DUDAS
*Acting Director of the United States Patent and Trademark Office*